United States Patent
Weikard et al.

(10) Patent No.: US 6,902,769 B2
(45) Date of Patent: Jun. 7, 2005

(54) PROCESS FOR PREPARING COATINGS ON POROUS AND/OR ABSORBENT MATERIALS

(75) Inventors: Jan Weikard, Odenthal (DE); Wolfgang Fischer, Meerbusch (DE); Manfred Müller, Mönchengladbach (DE)

(73) Assignee: Bayer Aktiengesellschaft (DE)

( * ) Notice: Subject to any disclaimer, the term of this patent is extended or adjusted under 35 U.S.C. 154(b) by 12 days.

(21) Appl. No.: 10/620,128

(22) Filed: Jul. 15, 2003

(65) Prior Publication Data

US 2004/0018318 A1 Jan. 29, 2004

Related U.S. Application Data

(62) Division of application No. 09/960,035, filed on Sep. 20, 2001, now Pat. No. 6,635,699.

(30) Foreign Application Priority Data

Sep. 25, 2000 (DE) .......................................... 100 47 290

(51) Int. Cl.$^7$ .............................. C08F 2/46; B32B 5/18
(52) U.S. Cl. .................. 427/508; 427/513; 427/521; 427/595; 427/243; 427/372.2; 427/389.9; 427/385.5; 428/474.4; 428/479.6; 428/480; 428/481; 428/513; 428/500; 428/307.3; 428/308.4; 428/308.8; 442/59
(58) Field of Search ................................ 427/508, 513, 427/521, 595, 243, 372.2, 389.9, 385.5; 428/307.3, 308.4, 308.8, 474.4, 479.6, 480, 481, 513, 500; 442/59

(56) References Cited

U.S. PATENT DOCUMENTS

| | | | |
|---|---|---|---|
| 4,462,926 A | | 7/1984 | Prater et al. ............. 252/315.1 |
| 4,526,920 A | * | 7/1985 | Sakashita et al. ............. 522/78 |
| 4,788,256 A | * | 11/1988 | Aoki et al. ............. 525/326.8 |
| 4,929,494 A | * | 5/1990 | Matsui et al. ............... 442/136 |
| 5,684,079 A | | 11/1997 | Yumoto et al. ............. 524/459 |
| 5,712,035 A | | 1/1998 | Ohtaka et al. ............. 428/378 |
| 6,136,383 A | | 10/2000 | Schwartz et al. ........... 427/513 |

FOREIGN PATENT DOCUMENTS

EP 1 174 401 A1 1/2002

* cited by examiner

Primary Examiner—Ana Woodward
(74) Attorney, Agent, or Firm—Joseph C. Gil

(57) ABSTRACT

The present invention relates to a process for process for preparing a coating by
a) applying to a porous and/or absorbent substrate a liquid coating composition containing at least one component having (meth)acryloyl groups and a dynamic viscosity of less than 2000 mPa.s and 0.1 to 10 wt. %, based on the non-volatile content of the coating composition, of an additive selected from polyamides, oligomeric fatty acid amides and polymeric fatty acid amides and
b) polymerizing the composition with radiation.

The present invention also relates to the resulting coated substrates and to the coating compositions used in the process.

24 Claims, No Drawings

PROCESS FOR PREPARING COATINGS ON POROUS AND/OR ABSORBENT MATERIALS

Divisional of prior application Ser. No. 09/960,035. Filed Sep. 20, 2001, now U.S. Pat. No. 6,635,699.

BACKGROUND OF THE INVENTION

1. Field of the Invention

The present invention relates to a process for the production of a coating on a porous and/or absorbent material by the radiation-induced polymerization of a liquid coating composition.

2. Description of the Prior Art

Coating compositions based on low-viscosity esters of (meth)-acrylic acid, which can be hardened by radiation, are known for example from DE-A 37 06 355. Such coating compositions with a dynamic viscosity typically lower than 1000 mPa.s are applied without the use of solvents and with the addition of photoinitiators and optionally additives, by various process, such as rolling, to substrates to be coated and then hardened by the action of UV radiation.

The low viscosity of the coating composition, which is important for applying thin layers, is a disadvantage if the substrate to be coated has porous and/or absorbent properties. Then, the liquid, low-viscosity coating composition can penetrate the substrate, with the result that when it is subsequently irradiated, the parts of the coating composition which have penetrated are not, or not fully, reached by the radiation and, thus, are not, or not completely, hardened. The unhardened, liquid components then have a detrimental affect on the quality of the coating. A phenomenon, among others, known to the person skilled in the art as 'sweating out' then occurs, in which liquid components seep through the hardened film and become visible on the surface of the coating. This effect can occur even after a very short time, for example a few hours, or only after a longer time, for example a few months.

An object of the present invention is to provide a process for producing a coating on a porous or absorbent material by applying the coating composition and then hardening it by UV radiation, which prevents sweating out of unhardened components.

This object may be achieved by the addition to the coating composition of certain additives, commonly used as thixotroping agents, which belong to the group of polyamides or oligomeric or polymeric fatty acid amides.

SUMMARY OF THE INVENTION

The present invention relates to a process for process for preparing a coating by
a) applying to a porous and/or absorbent substrate a liquid coating composition containing at least one component having (meth)acryloyl groups and a dynamic viscosity of less than 2000 mPa.s and 0.1 to 10 wt. %, based on the non-volatile content of the coating composition, of an additive selected from polyamides, oligomeric fatty acid amides and polymeric fatty acid amides and
b) polymerizing the composition with radiation.

The present invention also relates to the resulting coated substrates and to the coating compositions used in the process.

DETAILED DESCRIPTION OF THE INVENTION

Liquid coating compositions which can be hardened by radiation are known and described, for example, in P. K. T. Oldring (Ed.), Chemistry & Technology of UV and EB Formulations for Coatings, Inks and Paints, Vol. 2, 1991, SITA Technology, London, p. 31–235. Examples include epoxyacrylates, urethane acrylates, polyester acrylates and amine-modified and un-modified polyether acrylates. Such products are available commercially and, depending on the composition, have viscosities of about 100 mPa.s to about 100,000 mPa.s. They are used alone or as blends.

Coating compositions with high viscosities are normally mixed with diluents, which also (co)polymerize during UV-hardening. Such diluents are described in P. K. T. Oldring (Ed.), Chemistry & Technology of UV and EB Formulations for Coatings, Inks and Paints, Vol. 2, 1991, SITA Technology, London, p. 237–285. The acrylic acid or methacrylic acid, preferably acrylic acid, esters of the following alcohols are given as examples. Monovalent alcohols include the isomeric butanols, pentanols, hexanols, heptanols, octanols, nonanols and decanols; cycloaliphatic alcohols such as isobornol, cyclohexanol and alkylated cyclohexanols and dicyclopentanol; arylaliphatic alcohols such as phenoxyethanol and nonylphenylethanol; and tetrahydrofurfuryl alcohols. Alkoxylated derivatives of these alcohols can also be used. Divalent alcohols include ethylene glycol, propane diol-1,2, propane diol-1,3, diethylene glycol, dipropylene glycol, the isomeric butane diols, neopentyl glycol, hexane diol-1,6, 2-ethylhexane diol and tripropylene glycol or alkoxylated derivatives of these alcohols. Preferred divalent alcohols include hexane diol-1,6, dipropylene glycol and tripropylene glycol. Trivalent alcohols include glycerine or trimethylol propane or their alkoxylated derivatives. Propoxylated glycerine is preferred. Alcohols such as pentaerythritol or ditrimethylol propane or their alkoxylated derivatives can also be used as polyvalent alcohols.

Coating compositions for the process according to the invention contain at least one component having (meth) acryloyl groups and a dynamic vicosity of less than 2000 mPa.s, preferably less than 1000 mPa.s and more preferably less than 500 mPa.s.

The coating compositions for the process according to the invention contain known initiators, which can initiate a radical polymerization after irradiation with high-energy radiation such as UV light. Such photoinitiators are described, for example, in P. K. T. Oldring (Ed.), Chemistry & Technology of UV and EB Formulations for Coatings, Inks & Paints, Vol. 3, 1991, SITA Technology, London, p. 61–325. They are used in quantities of 0.1 to 10 parts by weight, preferably 2 to 7 parts by weight and more preferably 3 to 4 parts by weight, based on the liquid coating composition.

The coating composition also contains, based on its non-volatile content, 0.1–10 wt. %, preferably 0.3–5 wt. % and more preferably 0.5–2 wt. % of an additive, selected from the group of polyamides and oligomeric or polymeric fatty acid amides. Suitable polyamides include waxy polyamide polymers and/or fatty acid-modified polyamides, which are available e.g. under the name Crayvallac Super (Lubrizol Coating Additives GmbH, Ritterhude, Germany) or Disparlon 6200, 6500 or 6600 (C. H. Erbslöh, Krefeld, Germany). Fatty acid amides are described for example in DE-A 31 35 183 (U.S. Pat. No. 4,462,926, herein incorporated by reference). Suitable oligomeric or polymeric fatty acid amides are commercially available e.g. under the name Crayvallac MT and Crayvallac SF (amide-modified, hydrogenated castor oil products, Lubrizol Coating Additives GmbH, Ritterhude, Germany). The effect of these products observed according to the invention was surprising, as many other thixotroping agents have no effect in the process according to the invention and are therefore not suitable.

The coating composition produced according to the invention can also be mixed with known additives. These include fillers, pigments, dyes, smoothing agents, matting agents or levelling agents, which are used in the conventional quantities. Solvents which are inert during radical polymerization can also be used. The process according to the invention then includes, between the coating and hardening processes, a ventilation or vaporization of the solvent from the liquid coating.

The process according to the invention is suitable for the production of high-quality coatings on absorbent and/or porous substrates such as paper, cardboard, leather, cloth, wood, wooden materials (for example medium density fiber board), ceramic or mineral materials and also on porous plastics.

The coating composition is applied to the material to be coated by known methods from lacquer technology such as spraying, applying with a doctor blade, rolling, flow coating, dipping, whirling and atomizing (vacuum). The liquid coating composition is hardened by irradiation with ultra-violet radiation. For this purpose, the coated material is moved under a mercury medium-pressure radiator. Hardening by UV-radiation is carried out in the known manner as described e.g. in P. K. T. Oldring (Ed), Chemistry & Technology of UV and EB Formulations for Coatings, Inks & Paints, Vol. 1, 1991, SITA Technology, London, p. 167–269.

The invention is further illustrated but is not intended to be limited by the following examples in which all parts and percentages are by weight unless otherwise specified.

EXAMPLES

The coating compositions set forth in the following table (figures in parts by weight) were formulated and homogenized by dispersion. The coating compositions were applied to oak veneer in a layer approximately 30 μm thick with a manual doctor blade. The sheets were then moved under a mercury high-pressure radiator with an output of 80 W per cm lamp length. In each case, hard, solvent-resistant films were formed (tested by 50 double rubs with a swab soaked in butyl acetate). To test the sweating out behavior, the films were rubbed down and the sanding dust was left overnight on the film or board. Next morning, the dampness of the sanding dust was assessed as a measure of sweating out. Completely dry sanding dust was marked as 0, very damp sanding dust was marked as 5.

| Formulations [Parts by weight] | Reference | | | | | According to the invention | | | | |
|---|---|---|---|---|---|---|---|---|---|---|
| Examples | 1 | 2 | 3 | 4 | 5 | 6 | 7 | 8 | 9 | 10 |
| Roskydal UA VP LS 2299 | 84 | | 84 | 84 | 84 | 84 | 84 | 84 | 84 | |
| Laromer PO 84 F | | 100 | | | | | | | | 100 |
| TPGDA | 16 | | 16 | 16 | 16 | 16 | 16 | 16 | | |
| DPGDA | | | | | | | | | 16 | |
| Esacure TZT | 2.5 | 2.5 | 2.5 | 2.5 | 2.5 | 2.5 | 2.5 | 2.5 | 2.5 | 2.5 |
| Byk 410 | | | 2 | | | | | | | |
| Aerosil 300 | | | | 2 | | | | | | |
| Crayvallac MT | | | | | 2 | | | | | |
| Crayvallac SF | | | | | | 2 | | | | |
| Crayvallac Super | | | | | | | 2 | | 2 | |
| Disparlon 6500 | | | | | | | | 2 | | 2 |
| Test [mark] | | | | | | | | | | |
| Sweating out 10.0 m/min | 3 | 5 | 4 | 3 | 0 | 0 | 0 | 1 | 0 | 0 |
| Sweating out 20.0 m/min | 5 | 5 | 5 | 3 | 0 | 0 | 0 | 1 | 0 | 0 |
| Sweating out 30.0 m/min | 5 | 5 | 5 | 3 | 1 | 1 | 0 | 1 | 0 | 0 |
| Sweating out 40.0 m/min | 5 | 5 | 5 | 4 | 1 | 2 | 0 | 2 | 0 | 0 |

Formulation: Figures in parts by weight
Roskydal UA VP LS 2299 (Bayer AG, Leverkusen, Germany) - amine-modified polyether acrylate, viscosity approx. 800 mPa · s.
Laromer PO84F (BASF AG, Ludwigshafen, Germany) - amine-modified oligoether acrylate, viscosity approx. 1000 mPa · s
TPGDA - tripropyleneglycol diacrylate
DPGDA - dipropyleneglycol diacrylate
Esacure TZT (Lamberti, Aldizzate, Italy), photo-initiator (modified benzophenone)
Byk 410 (Byk-Chemie, Wesel, Germany) - solution of a modified urea
Aerosil 300 (Degussa-Hüls, Frankfurt, Germany) - pyrogenic silicic acid
Crayvallac MT and Crayvallac SF (Lubrizol Coating Additives, Ritterhude, Germany) - amine-modified, hydrogenated castor oil
Crayvallac Super (Lubrizol Coating Additives, Ritterhude, Germany) - polyamide wax
Disparlon 6500 (C. H. Erbslöh, Krefeld, Germany) - fatty acid-modified polyamide
Various boards were hardened at different belt speeds (10, 20, 30, 40 m/min) and the sweating out behaviour was tested: 0 = best mark, 5 = worst mark.

The examples clearly show that the process according to the invention (examples 5–10) significantly reduced and often even completely prevented sweating out in comparison with the comparison compositions (examples 1–4).

Although the invention has been described in detail in the foregoing for the purpose of illustration, it is to be understood that such detail is solely for that purpose and that variations can be made therein by those skilled in the art without departing from the spriit and scope of the invention except as it may be limited by the claims.

What is claimed is:
1. A process for preparing a coating which comprises
   a) applying to a porous and/or absorbent substrate a liquid coating composition comprising at least one compo- nent having (meth)acryloyl groups and a dynamic viscosity of less than 2000 mPa.s and 0.1 to 10 wt. %, based on the non-volatile content of the coating composition, of an additive comprising a polyamide, and b) polymerizing the composition with radiation.

2. The process of claim 1 wherein the substrate is paper.

3. The process of claim 1 wherein the substrate is cardboard.

4. The process of claim 1 wherein the substrate is cloth.

5. The process of claim 1 wherein the substrate is wood.

6. The process of claim 1 wherein the substrate is a wooden material.

7. The process of claim 1 wherein the substrate is fiberboard.

8. The process of claim 1 wherein the substrate is a ceramic substrate.

9. The process of claim 1 wherein the substrate is a mineral substrate.

10. The process of claim 1 wherein the substrate is a porous plastic.

11. The process of claim 1 wherein the polyamide comprises oligomeric fatty acid amides.

12. The process of claim 1 wherein the polyamide comprises polymeric fatty acid amides.

13. A coated substrate prepared by a process which comprises a) applying to a porous and/or absorbent substrate a liquid coating composition comprising at least one component having (meth)acryloyl groups and a dynamic viscosity of less than 2000 mPa.s and 0.1 to 10 wt. %, based on the non-volatile content of the coating composition, of an additive comprising a polyamide and b) polymerizing the composition with radiation.

14. The coated substrate of claim 13 wherein the substrate is paper.

15. The coated substrate of claim 13 wherein the substrate is cardboard.

16. The coated substrate of claim 13 wherein the substrate is cloth.

17. The coated substrate of claim 13 wherein the substrate is wood.

18. The coated substrate of claim 13 wherein the substrate is a wooden material.

19. The coated substrate of claim 13 wherein the substrate is fiberboard.

20. The coated substrate of claim 13 wherein the substrate is a ceramic substrate.

21. The coated substrate of claim 13 wherein the substrate is a mineral substrate.

22. The coated substrate of claim 13 wherein the substrate is a porous plastic.

23. The process of claim 13 wherein the polyamide comprises oligomeric fatty acid amides.

24. The process of claim 13 wherein the polyamide comprises polymeric fatty acid amides.

* * * * *